United States Patent
Specht et al.

(10) Patent No.: US 9,610,915 B2
(45) Date of Patent: Apr. 4, 2017

(54) AIRBAG ARRANGEMENT FOR A CLOSEABLE OR OPENABLE ROOF OPENING OF A MOTOR VEHICLE

(71) Applicant: Key Safety Systems, Inc., Sterling Heights, MI (US)

(72) Inventors: Martin Specht, Feldafing (DE); Klaus Meiler, Herrsching (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/411,761

(22) PCT Filed: Jul. 9, 2013

(86) PCT No.: PCT/IB2013/001493
§ 371 (c)(1),
(2) Date: Dec. 29, 2014

(87) PCT Pub. No.: WO2014/009791
PCT Pub. Date: Jan. 16, 2014

(65) Prior Publication Data
US 2015/0137490 A1   May 21, 2015

(30) Foreign Application Priority Data
Jul. 10, 2012  (DE) ........................ 10 2012 013 698

(51) Int. Cl.
*B60R 21/213* (2011.01)
*B60R 21/214* (2011.01)
(Continued)

(52) U.S. Cl.
CPC .......... *B60R 21/213* (2013.01); *B60R 21/214* (2013.01); *B60R 21/233* (2013.01);
(Continued)

(58) Field of Classification Search
CPC ... B60R 21/213; B60R 21/233; B60R 21/214; B60R 2011/0077; B60R 2021/23161; B60R 2021/23192
(Continued)

(56) References Cited

U.S. PATENT DOCUMENTS 5,470,103 A * 11/1995 Vaillancourt ......... B60R 21/214
                                                         280/730.1
5,775,726 A *  7/1998 Timothy ............... B60R 21/013
                                                         280/730.1
(Continued)

FOREIGN PATENT DOCUMENTS

DE       10007343       8/2001
DE       10039805       5/2002
(Continued)

OTHER PUBLICATIONS

Wohllebe et al. DE 100 39805, English Machine Translation.*

*Primary Examiner* — Karen Beck
(74) *Attorney, Agent, or Firm* — Markell Seitzman (57) ABSTRACT

An airbag arrangement for closeable or openable roof opening 2 of a motor vehicle has a gas cushion arrangement which is to be anchored to the vehicle roof 1 and which is suitable in the inflated state for covering the surface of the roof opening 2, wherein the gas cushion arrangement has two inflatable gas cushions 3, 4 which are suitable in the non-inflated state for being arranged along lateral inside edges 5, 6 of the roof opening 2, that extend in the longitudinal direction of the vehicle.

16 Claims, 5 Drawing Sheets

(51) Int. Cl.
  *B60R 21/233* (2006.01)
  *B60R 11/00* (2006.01)
  *B60R 21/231* (2011.01)

(52) U.S. Cl.
  CPC .............. *B60R 2011/0077* (2013.01); *B60R 2021/23161* (2013.01); *B60R 2021/23192* (2013.01)

(58) Field of Classification Search
  USPC ...................................................... 280/728.2
  See application file for complete search history.

(56) References Cited

U.S. PATENT DOCUMENTS

| | | | | |
|---|---|---|---|---|
| 6,123,355 A * | 9/2000 | Sutherland | ............ | B60R 21/231 280/728.2 |
| 6,457,740 B1 * | 10/2002 | Vaidyaraman | ........ | B60R 21/231 280/730.2 |
| 6,817,626 B2 * | 11/2004 | Boll | ...................... | B60R 21/213 280/730.1 |
| 7,222,877 B2 * | 5/2007 | Wipasuramonton | .. | B60R 21/214 280/729 |
| 7,854,448 B2 * | 12/2010 | Gloeckler | ............ | B60R 21/213 280/728.2 |
| 8,220,829 B2 * | 7/2012 | Choi | .................... | B60R 21/214 280/728.2 |
| 8,403,358 B2 * | 3/2013 | Choi | .................... | B60R 21/214 280/728.2 |
| 8,414,017 B2 * | 4/2013 | Lee | ....................... | B60R 21/231 280/730.1 |
| 8,579,321 B2 * | 11/2013 | Lee | ....................... | B60R 21/214 280/729 |
| 9,004,526 B2 * | 4/2015 | Fukawatase | .......... | B60R 21/231 280/729 |
| 9,016,717 B1 * | 4/2015 | Clauser | ................. | B60R 21/233 280/729 |
| 2002/0125690 A1 * | 9/2002 | Boll | ..................... | B60R 21/213 280/730.1 |
| 2003/0122354 A1 * | 7/2003 | Spaulding | ............ | B60R 21/213 280/730.2 |
| 2011/0049845 A1 * | 3/2011 | Choi | .................... | B60R 21/214 280/728.2 |
| 2014/0375033 A1 * | 12/2014 | Fukawatase | .......... | B60R 21/214 280/729 |
| 2015/0137490 A1 * | 5/2015 | Specht | ................. | B60R 21/214 280/728.2 |

FOREIGN PATENT DOCUMENTS

| | | |
|---|---|---|
| EP | 0810128 | 12/1997 |
| EP | 0816180 | 1/1998 |
| EP | 0933264 | 8/1999 |
| EP | 1676758 | 7/2006 |
| EP | 1707450 | 10/2006 |
| EP | 1757494 | 2/2007 |

* cited by examiner

AIRBAG ARRANGEMENT FOR A CLOSEABLE OR OPENABLE ROOF OPENING OF A MOTOR VEHICLE

RELATED APPLICATIONS

This application claims benefit of priority to PCT Application Serial Number PCT/IB2013/001493 international filing date of Jul. 9, 2013, the disclosure of which is incorporated herein by reference in its entirety.

The invention relates to an airbag arrangement for a closeable or openable roof opening of a motor vehicle, comprising a gas cushion arrangement which is to be anchored to the vehicle roof and which is suitable in the inflated state for covering the surface of the roof opening.

Such an airbag arrangement is known from EP 0 933 264 A1. In said prior art airbag arrangement, the roof opening is completely covered by a gas cushion which is configured as a curtain airbag. In the non-inflated state, the gas cushion is accommodated, when viewed in the longitudinal direction of the vehicle, either in the front frame section or in the rear frame section defining the roof opening. When the gas cushion is inflated, it covers the entire roof opening. In order to cover larger roof openings, as in the case of panoramic vehicle roofs, for example, a plurality of gas cushions and additional releasing means are used in order to obtain exact positioning of the airbag in the event of an accident.

An airbag arrangement comprising two inflatable gas cushions is known from EP 0 810 128 A2. In the inflated state, the two gas cushions extend between the continuous outer skin of the vehicle and the interior roof lining. The one gas cushion is situated above the front seat area and the other gas cushion is situated above the back seat area or above the rear passenger seats.

The object of the invention is to provide an airbag arrangement of the kind initially specified which is suitable for completely and safely covering, with simple means, a roof opening, in particular of a panoramic vehicle roof, in the event of an accident, in particular in a rollover situation.

This object is achieved by the features of claim 1. The dependent claims contain advantageous developments of the invention.

The gas cushion arrangement according to the invention contains two inflatable gas cushions. These gas cushions are suitable, in the non-inflated state, for being arranged outside and along lateral inside edges of the vehicle roof opening, which extend in the longitudinal direction of the vehicle. The gas cushions are arranged in such a way that, when the gas cushions are being inflated, the two front cushion edges, which extend in the longitudinal direction of the vehicle when in the inflated state, are moved towards each other. The two front cushion edges are designed in such a way that when they meet they are connected fixedly and in particular stably to each other, especially by means of a form locking interconnection. This can be achieved, for example, by providing one or more velcro strips on the two front cushion edges. The velcro strips hook into each other and provide a strong connection between the two inflated gas cushions. The two front cushion edges may also be shaped in such a way that they hookingly engage each other when in the inflated state. The cushion edges of the two gas cushions, which extend transversely to the longitudinal direction of the vehicle after inflation, are adapted and dimensioned such that they are guided during inflation beneath the vehicle roof along the two inside edges of the roof opening, which extend transversely to the longitudinal direction of the vehicle, and are arranged there in the inflated state. The roof opening should be understood to be a cut-out region in a vehicle roof, or the opening in a sliding roof frame, or the opening in a pre-mounted roof section module which can be fitted to the vehicle roof.

A preferred embodiment is one in which the cushion edges extending transversely to the longitudinal direction of the vehicle when the two gas cushions are in the inflated state can be held by the filling pressure of the inflation gas with an overlap region beneath the roof regions adjacent to the roof opening and extending transversely to the longitudinal direction of the vehicle.

The fabric or material of the gas cushions is such that the filling pressure inside the cushions can be maintained during the accident, in particular during one or more rollovers. The duration that the pressure is maintained may be up to 10 seconds or more.

In order to guide the cushion edges extending transversely to the longitudinal direction of the vehicle, guide and anchoring means may be provided, for example in the form of rails which extend transversely to the longitudinal direction of the vehicle along the inside edges of the roof opening. During inflation, the cushion edges can be guided in these guide and anchoring means, which are fixedly connected to the outer vehicle roof, and the cushion edges can be fixed to the vehicle roof when they are in the inflated state. Inside the cushions, tensioning straps may be provided, the one ends of which are fixedly connected to the vehicle body and the other ends of which are brought during inflation into a position in which straps are tensioned.

The airbag arrangement according to the invention is preferably suitable for covering large roof openings, such as those found in panoramic vehicle roofs, for example. The roof openings may be designed to be selectively closeable and openable. However, the roof opening may also be covered by a transparent cover which is fixedly disposed in the roof frame surrounding the roof opening. Selectively closeable and openable roof openings may be covered by flexible, in particular foldable roof elements, or by rigid moveable roof elements.

The invention provides an airbag device which ensures that passengers are protected in the event of an accident, above all in a rollover situation. This is primarily achieved by providing mechanical reinforcement in the region of the roof opening by means of the rigid connection between the two inflated gas cushions. This protection specifically prevents the vehicle passengers from being ejected through the open roof opening or from being injured, in particular in the head region, on the cover for the roof opening. The connection formed by the two inflated gas cushions also provides stiffening and increased stability in the region of the vehicle roof and in particular in the region of the roof opening.

In addition, side impact protection can be provided in the form of a curtain gas cushion. In the inflated state, this curtain airbag extends along the lateral boundary of the vehicle interior, in particular in the side window area. Such side impact protection is known, for example, from EP 0 816 180 B1.

It is advantageous when each of the two gas cushions has an L-shaped cross-section when in the inflated state, with one cushion limb being adapted to cover the roof opening and the other cushion limb being adapted to provide side impact protection along the lateral boundary of the vehicle interior, in particular in the region of the side windows. At at least one of the two front cushion edges, a cushion limb which projects downwards when in the inflated state may be formed, which extends downwardly between two adjacent seat positions and which prevents any collision between the heads of the passengers in the event of a rollover or side impact situation.

Embodiments of the invention shall now be described in detail with reference to the Figures, in which.

The embodiments of an airbag arrangement as shown in the Figures contain two inflatable gas cushions 3 and 4. Inflatable gas cushions 3 and 4 are adapted such that they can be arranged, in the non-inflated state, along lateral inside edges 5 and 6 of roof opening 2, which extend in the longitudinal direction of the vehicle. When gas cushions 3 and 4 are being inflated, front cushion edges 7 and 8 extending in the inflated state in the longitudinal direction of the vehicle are moved towards each other. When the two front cushion edges 7 and 8 meet, they are connected fixedly to each other, especially by means of a form locking interconnection. To achieve this, a velcro fastener system 27 which fixedly connects the two cushion edges 7 and 8 to each other may be provided, preferably in the area 26 where the two front cushion edges 7 and 8 meet. The fixed connection between the two cushion edges 7 and 8 is further supported by the filling pressure prevailing in the two inflated gas cushions 3 and 4.

Figure 8:
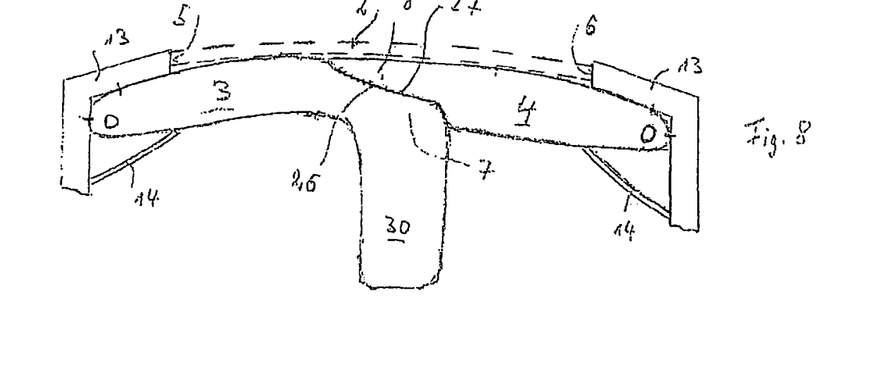
FIG. 8 shows another modified embodiment of the gas cushions.

The two front cushion edges 7 and 8 may overlap when the two gas cushion 3 and 4 are in the inflated state, or they may also abut each other bluntly with their front surfaces. However, it is also possible that the two front cushion edges 7 and 8 are pushed into each other when the gas cushions are inflated, the one cushion being shaped at its front edge in the form of a recess, into which the front edge of the other gas cushion is pushed or inserted. When the two front cushion edges 7 and 8 are hookingly engaged with each other in the insertion region by means of undercuts 28, 29 (FIG. 8), a sufficiently strong connection between the two inflated gas cushions 3 and 4 can be achieved in region 26 by this means alone. An additional velcro fastener system may be provided where the two edge regions abut.

In the inflated state, the two gas cushions 3 and 4 completely cover a roof opening in a vehicle roof 1. In order to attach gas cushions 3 and 4 to the vehicle body, one or more cushion mounts 23 are provided on the rear edge of the respective gas cushion 3 and 4. A firm connection between gas cushion 3 or 4 and a vehicle body member 13 extending in the lateral roof edge area of the vehicle body is achieved by means of these cushion mounts 23.

In the non-inflated state, gas cushions 3 and 4 are arranged in the respective lateral roof edge area between vehicle body member 13 and an interior lining 14, as shown, for example, in the cutaway view in FIGS. 4-8, 8 and 10, 11 (in which the cut is made transversely to the longitudinal direction of the vehicle in the region of roof opening 2).

Figure 2:
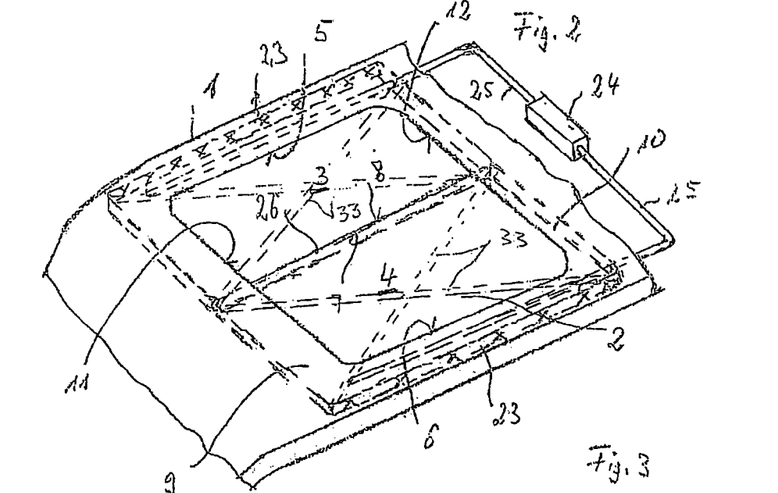
FIG. 2 shows a vehicle roof with inflated gas cushions in the region of the roof opening, the two inflatable gas cushions being component parts of an embodiment of an airbag arrangement according to the invention.
Figure 7:
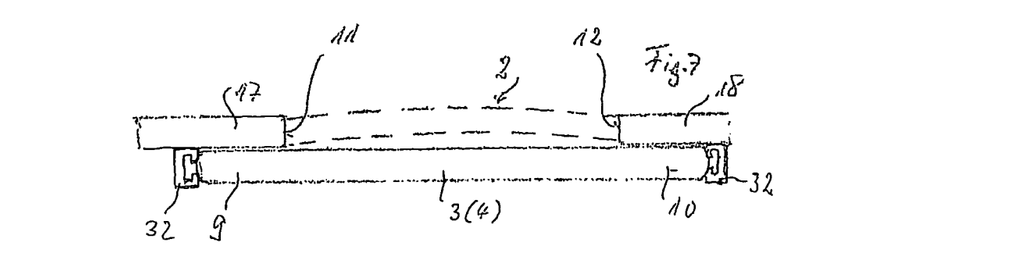
FIG. 7 shows the arrangement of cushion edges extending transversely to the longitudinal direction of the vehicle, when the gas cushions are inflated.

In the inflated state, cushion edges 9 and 10 extending transversely to the longitudinal direction of the vehicle extend beneath the vehicle roof 1 along the two inside edges 11 and 12 of roof opening 2, which extend transversely to the longitudinal direction of the vehicle, in order to provide additional fixing of the gas cushions to vehicle roof 1, as shown in FIGS. 2 and 7. During inflation of the gas cushions, the two cushion edges 9 and 10 extending transversely to the longitudinal direction of the vehicle are guided beneath vehicle roof 1 along the inside edges 11 and 12 of the roof opening and extend, when the two gas cushions 3 and 4 are in the inflated state, with an overlap region beneath the roof regions 17 and 18 extending transversely to the longitudinal direction of the vehicle and defining roof opening 2 (FIG. 7). This overlapping arrangement between roof regions 17 and 18 and cushion edges 9 and 10 is maintained by the filling pressure of the inflation gas that is exerted inside the two gas cushions 3 and 4.

Figure 3:
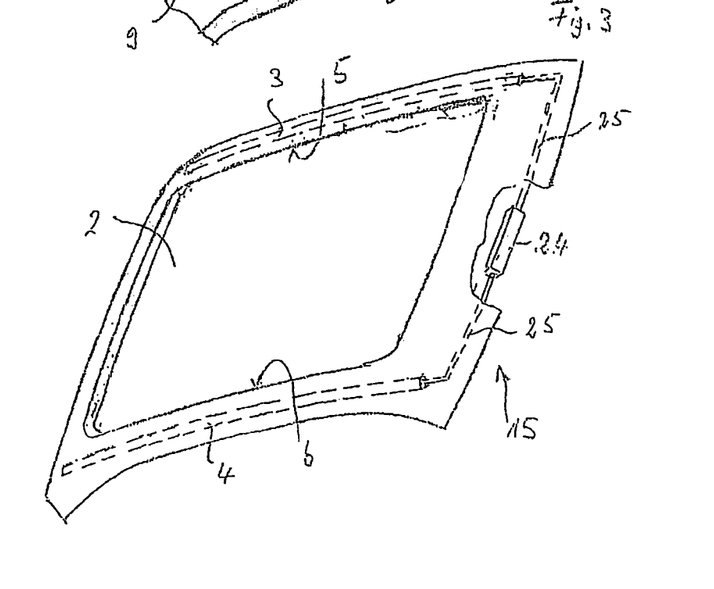
FIG. 3 shows a roof section module which is fitted with an embodiment of an airbag arrangement according to the invention and which can be fitted into a vehicle roof.
Figure 4:
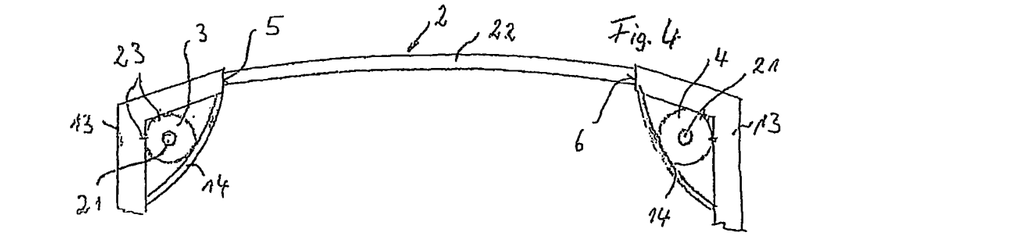
FIG. 4 shows a cutaway view of an embodiment of the invention, in which the two gas cushions are arranged between a vehicle body part and an interior lining in a respective lateral roof edge area.
Figure 5:
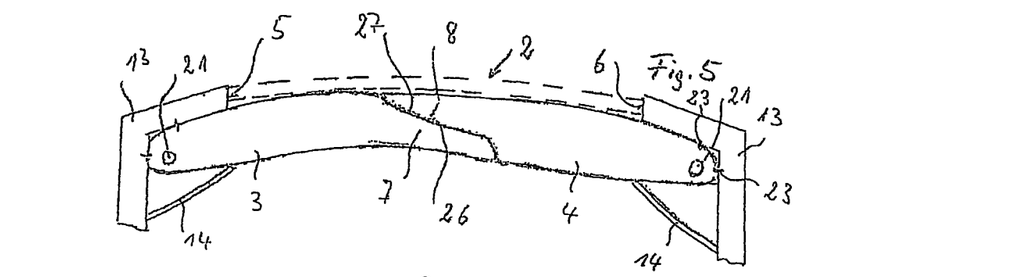
FIG. 5 shows the embodiment of FIG. 4, when both gas cushions have been inflated.

As shown in FIG. 2, the airbag arrangement may be attached to the vehicle roof 1. However, it is also possible to arrange the airbag arrangement containing the two gas cushions 3 and 4 in a roof section module 15 (FIG. 3). This roof section module 15 is adapted so that it can be fitted into vehicle roof 1.

Figure 1:
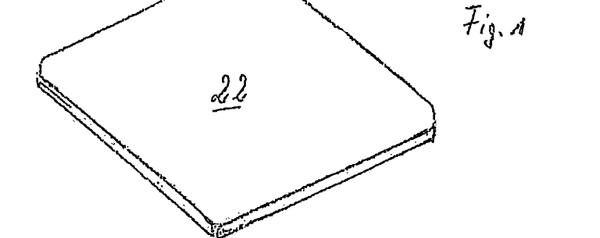
FIG. 1 shows a schematic view of a cover for a roof opening of a vehicle roof.

Along the inside edges 11 and 12 of the roof opening, guide and anchoring means 32 may be provided, in which cushion edges 9, 10 are guided with interlocking engagement during inflation and anchored in the inflated state to vehicle roof 1. As shown in FIG. 1, it is also possible to provide straps 33 inside gas cushions 3, 4, said straps extending diagonally when gas cushions 3 and 4 are in the inflated state. The one ends of straps 33 are fastened to the vehicle roof 1, and the other ends of straps 33 are connected to gas cushions 3, 4 in the region of the front cushion edges 7, 8. Additional stabilisation of the gas cushions in the inflated state can be achieved by means of straps 33.

Figure 10:
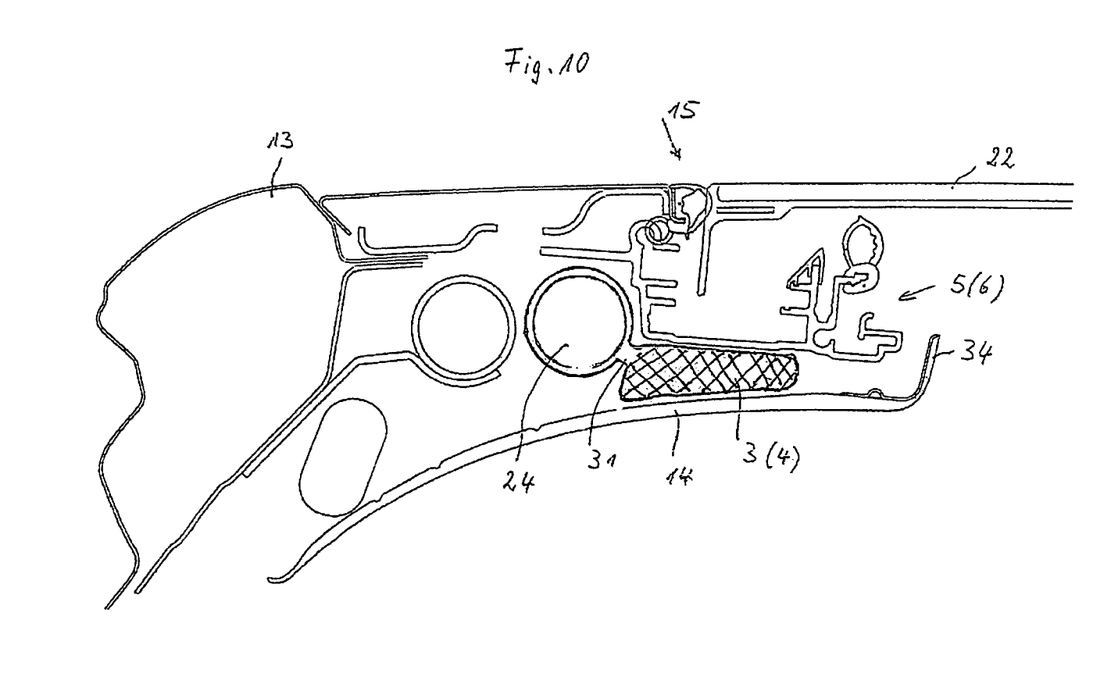
FIG. 10 shows an embodiment for an installation arrangement.
Figure 11:
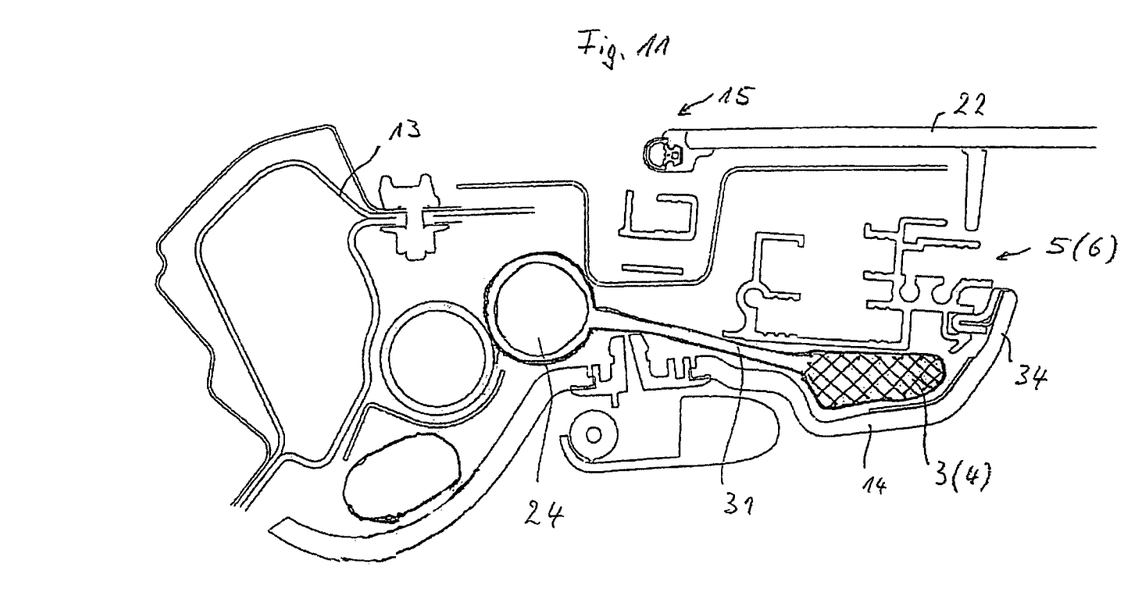
FIG. 11 shows another embodiment for an installation arrangement.

FIGS. 10 and 11 show embodiments in which the airbag arrangement (gas cushions 3, 4 and gas generator 24) can be installed from below (bottom mounted) if the vehicle roof is closed (FIG. 10), and from above (top mounted) if the vehicle roof is still open (FIG. 11). In these embodiments, the cover 22 for the opening can be arranged in roof section module 15. Roof section module 15 is fixed to vehicle body member 13.

In the embodiment shown in FIG. 10, gas cushions 3, 4, which are connected via a gas conduit 31 to gas generator 24, are installed from below, that is to day from the interior of the vehicle, and after installation the interior lining 14 which covers the airbag arrangement towards the vehicle interior is mounted. In the embodiment shown in FIG. 11, gas cushions 3, 4 and the associated gas generator 24 are installed through the roof opening above the interior lining 14 that has already been mounted. The roof opening is then closed by mounting roof section module 15 on vehicle body member 13. When gas cushions 3, 4 are being filled, ends 34 of interior lining 14 are opened by folding them downwards, so that gas cushions 3, 4 can expand transversely to the longitudinal direction of the vehicle during inflation. These two ways of mounting the airbag arrangement are also possible when a sliding roof frame has already been installed in the roof cut-out region.

A filling gas source 24 is used to fill gas cushions 3 and 4 and may be a conventional gas generator for filling airbags. Filling gas source 24 and the gas conduit leading to the respective gas cushion are preferably positioned such that the lateral gas cushions can be inflated with gas anywhere between the ends and the middle of the gas cushions, with optimal utilisation of the space between the vehicle body and the roof opening.

As shown in the embodiments in FIGS. 2 to 6, a shared filling gas source 24 may be provided for both the gas cushions 3 and 4. However, it is also possible to provide separate filling gas sources 24 for the respective gas cushions 3 and 4, as shown in FIGS. 10 and 11. The filling gas is supplied to gas cushions 3 and 4 via gas conduits 25. In order to bring the filling gas inside the gas cushions as fast as possible, the gas can be injected with the aid of a gas lance 21 which is gas-tightly connected to the respective gas conduit 25. Gas lance 21 has openings along its length, so that gas cushions 3 and 4 are rapidly filled along their entire length. Gas lance 21 may be embodied as a rigid gas lance or as a flexible gas lance. It may also be provided in the form of a tuck on the inside of the respective gas cushion 3 and 4, or be woven directly into an OPW (one piece woven) gas cushion.

Roof opening 2 may be covered by a transparent cover 22 which is fixedly connected to vehicle roof 1. However, it is also possible to use, as cover 22, one or more moveable roof elements with which roof opening 2 can be selectively closed and opened. Instead of rigid roof elements, it is also possible to use a flexible cover 22, for example a foldable cover 22.

Figure 6:
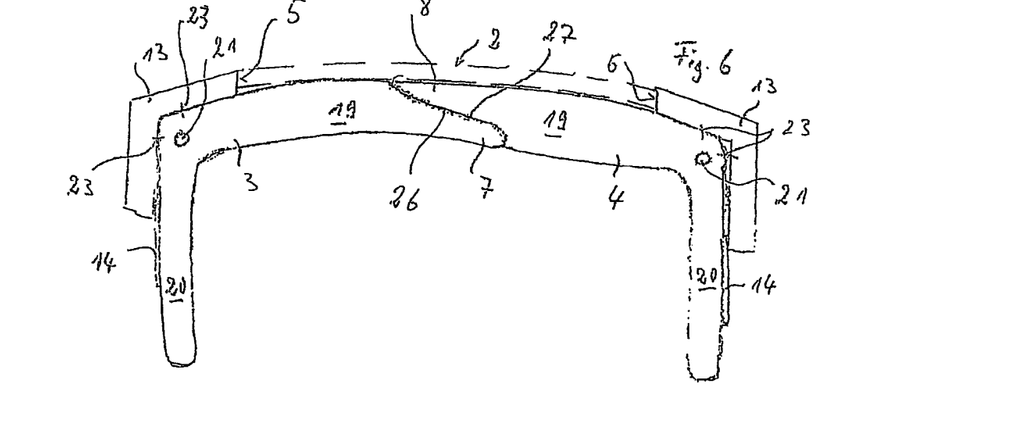
FIG. 6 shows a modified embodiment of the embodiment in FIG. 4, with inflated gas cushions.
Figure 9:
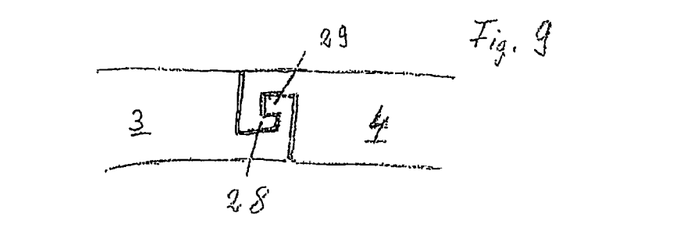
FIG. 9 shows embodiments for the front cushion edges.

In the embodiment shown in FIG. 6, the two gas cushions 3 and 4 have an L-shaped cross-section when they are in the inflated state. One cushion limb 19 is used to cover roof opening 2, and the respective other cushion limb 20 is adapted to provide side impact protection. Cushion limbs 20 extend along the two lateral boundaries of the vehicle interior, in particular in the region of the side windows. In the embodiment shown in FIG. 8, a middle cushion limb 30 which when inflated extends downwards between two seat positions inside the vehicle is provided at one of the front cushion edges (cushion edge 7). Velcro fastener system 27 may be provided in the adjoining region of the two front cushion edges 7 and 8. It is also possible to provide the undercut connection between the two front cushion edges 7 and 8, as shown in FIG. 9. Middle impact protection can be provided between two vehicles passengers sitting side by side can be provided in the region of their heads by middle cushion limb 30. It is also possible to provide, at each of the two front cushion edges 7, 8, middle cushion limbs 30 which abut each other and which can be connected to each other by means of velcro strips.

LIST OF REFERENCE SIGNS

1 Vehicle roof
2 Roof opening
3 Gas cushion
4 Gas cushion
5, 6 Lateral inside edges
7, 8 Front cushion edges
9, 10 Cushion edges extending transversely to the longitudinal direction of the vehicle
11, 12 Inside edges extending transversely to the longitudinal direction of the vehicle
13 Vehicle body member
14 Interior lining
15 Roof section module
16 Velcro fastener system
17, 18 Roof areas extending transversely to the longitudinal direction of the vehicle
19, 20 Cushion limbs
21 Gas lance
22 Cover for opening
23 Cushion mount
24 Filling gas source
25 Gas conduits
26 Region
27 Velcro fastener system
28, 29 Hook-shaped undercuts
30 Middle cushion limb
31 Gas conduit
32 Guide and anchoring means
33 Straps
34 End of lining

The invention claimed is:

1. An airbag arrangement for a closeable or openable roof opening (2) of a motor vehicle, comprising a gas cushion arrangement which is to be anchored to the vehicle roof (1) and which is suitable in the inflated state for covering the surface of the roof opening (2), wherein
the gas cushion arrangement has two inflatable gas cushions (3, 4) which are suitable in the non-inflated state for being arranged along lateral inside edges (5, 6) of the roof opening (2), that extend in the longitudinal direction of the vehicle, and
upon inflation into the inflated state for moving two front cushion edges (7, 8) extending in the longitudinal direction of the vehicle towards each other,
wherein when the two front cushion edges (7, 8) meet they are stably connected to each other, and
wherein lateral cushion edges (9, 10) of the two gas cushions (3, 4) extending transversely to the longitudinal direction of the vehicle are suitable to be moved during inflation beneath the vehicle roof along two frontal inside edges (11, 12) of the roof opening, that extend transversely to the longitudinal direction of the vehicle, and are guided thereat,
wherein the lateral cushion edges extending transversely to the longitudinal direction of the vehicle when the two gas cushions are in the inflated state are held by the filling pressure of the inflation gas with an overlap region beneath roof regions extending transversely to the longitudinal direction of the vehicle and adjacent to the roof opening.

2. The airbag arrangement according to claim 1, wherein the two front edges (7, 8) of the inflated gas cushions (3, 4) are connected by means of a form locking interconnection.

3. The airbag arrangement according to claim 1, wherein the two gas cushions (3, 4) are arranged in the non-inflated state between a vehicle body member (13) and an interior lining (14) in the respective lateral roof edge region.

4. The airbag arrangement according claim 1, wherein the two gas cushions (3, 4) are arranged in the non-inflated state in a roof section having the roof opening (2), which roof section can be fitted as a roof section module (15) in the vehicle roof (1).

5. The airbag arrangement according to 1, wherein the two gas cushions (3, 4) are adapted to be installed from outside through the open vehicle roof (1).

6. The airbag arrangement according to claim 1, wherein the two gas cushions (3, 4) are adapted to be installed from inside the vehicle.

7. The airbag arrangement according to claim 1, wherein the front cushion edges (7, 8) are connected to each other by hooking engagement when the two gas cushions (3, 4) are in the inflated state.

8. The airbag arrangement according to claim 1, wherein the front cushion edges (7, 8) overlap each other entirely or partially when the two gas cushions (3, 4) are in the inflated state.

9. The airbag arrangement according to claim 1, wherein the front cushion edges (7, 8) are pushed into each other when the two gas cushions (3, 4) are in the inflated state.

10. The airbag arrangement according to claim 1, wherein the cushion edges extending transversely to the longitudinal direction of the vehicle (9, 10) are connected to guide and anchoring means (32) which during inflation guide the cushion edges along the inside frontal edges (11, 12) of the roof opening, that extend transversely to the longitudinal direction of the vehicle, and in the inflated state anchor the lateral cushion edges (9, 10) to the vehicle roof (1).

11. The airbag arrangement according to claim 1, wherein straps (33) which are tensioned during inflation of the gas cushion are arranged inside the gas cushions (3, 4).

12. The airbag arrangement according to claim 1, wherein the two gas cushions (3, 4) are adapted to cover the roof opening (2) of a panoramic vehicle roof when they are in the inflated state.

13. The airbag arrangement according to claim 1, wherein each of the two gas cushions (3, 4) has an L-shaped cross-section with two cushion limbs when in the inflated state, wherein the one respective cushion limb (19) is adapted to cover the roof opening (2) and the respective other cushion limb (20) is adapted to provide side impact protection.

14. The airbag arrangement according to claim 1, wherein the filling gas is fed into the interior of the respective gas cushion by way of an associated gas lance (21) having inflation openings.

15. The airbag arrangement according to claim 1, wherein at least one of the two gas cushions has a cushion limb (30) at the front cushion edge (7), which in the inflated state extends downwardly between two seat positions in the vehicle.

16. The airbag arrangement according to claim 4, wherein the gas cushions (3, 4) and at least one associated filling gas source (24) are adapted to be pre-mounted from above (top mounted) or from below (bottom mounted) in the roof opening (2) provided in the roof section module (15).

* * * * *